United States Patent [19]

Petraschek et al.

[11] 3,736,972
[45] June 5, 1973

[54] PNEUMATIC TIRE AND METHOD FOR THE MANUFACTURE THEREOF

[75] Inventors: Ernst Petraschek; Oskar Mick, both of Maria Enzersdorf; Erich Kresta, Perchtoldsdorf; Josef Windbichler, Gemeinde Lanzenkirchen; Johann Zoechling, Baden, all of Austria

[73] Assignee: Semperit Aktiengesellschaft, Vienna, Austria

[22] Filed: Feb. 5, 1971

[21] Appl. No.: 112,957

[30] Foreign Application Priority Data

Feb. 20, 1970 Austria..............................A1591/70

[52] U.S. Cl............................................152/354
[51] Int. Cl.............................................B60c 9/12
[58] Field of Search.......................152/354, 356, 359

[56] References Cited

UNITED STATES PATENTS

| | | | |
|---|---|---|---|
| 2,628,652 | 2/1953 | Orr | 152/354 |
| 2,007,909 | 7/1935 | State | 152/354 |
| 1,350,995 | 8/1920 | Grabav | 152/354 |
| 1,402,808 | 1/1922 | Thomley | 152/371 |
| 3,244,215 | 4/1966 | Bridge | 152/356 |
| 2,945,525 | 7/1960 | Lugli | 152/361 |
| 1,373,094 | 3/1921 | Preyer | 152/354 |

*Primary Examiner*—Gerald M. Forlenza
*Assistant Examiner*—D. W. Keen
*Attorney*—Werner W. Kleeman

[57] ABSTRACT

There is disclosed an improved pneumatic tire and method of manufacturing thereof wherein such pneumatic tire incorporates a compounded layer consisting of at least two plies and arranged in spiral-like configuration at the tire.

7 Claims, 11 Drawing Figures

Patented June 5, 1973
3,736,972
3 Sheets-Sheet 1
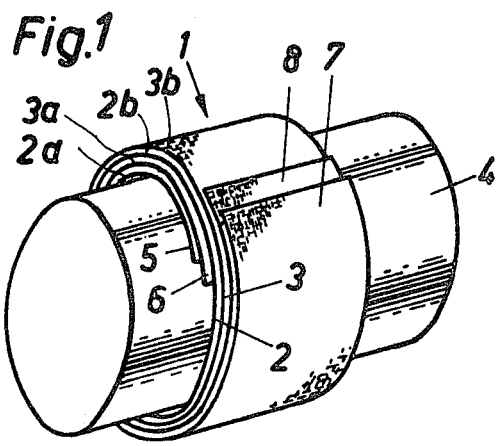
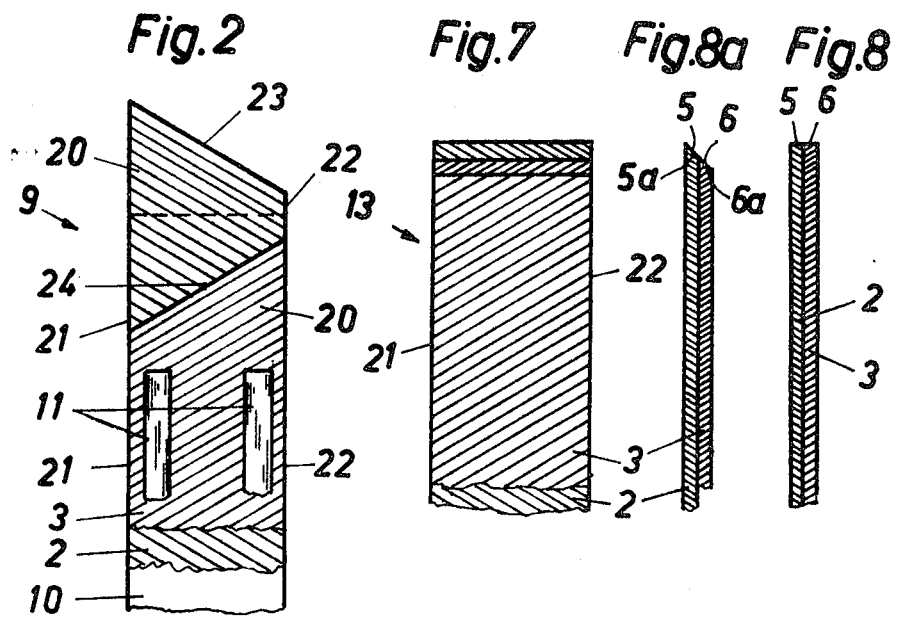
INVENTORS
ERNST PETRASCHEK
OSKAR MICK
ERICH KRESTA
JOSEF WINDBICHLER
JOHANN ZÖCHLING
BY
WERNER W. KLEEMAN  ATTORNEY

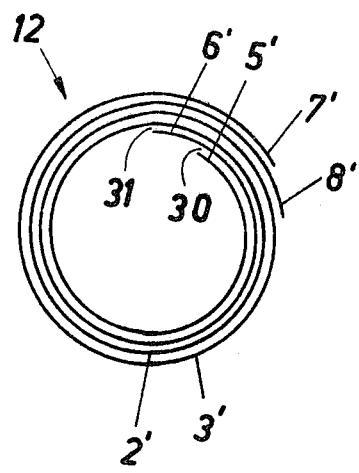
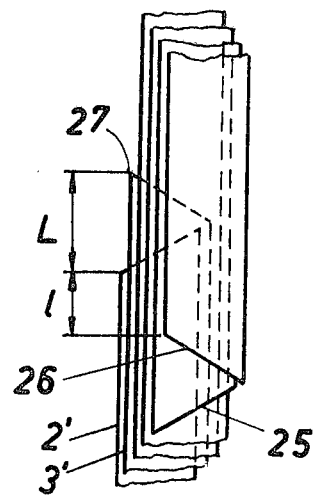
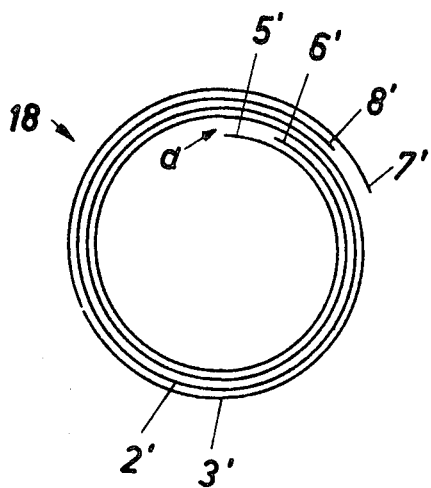
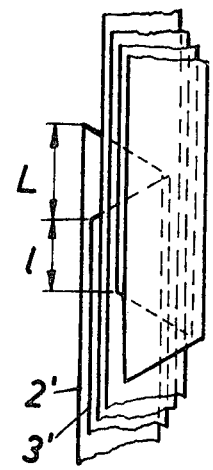

INVENTORS
ERNST PETRASCHEK
OSKAR MICK
ERICH KRESTA
JOSEF WINBICHLER
JOHANN ZÖCHLING
BY WERNER WURLIGMAN
ATTORNEY

PNEUMATIC TIRE AND METHOD FOR THE MANUFACTURE THEREOF

BACKGROUND OF THE INVENTION

The present invention broadly relates to the tire manufacturing art and, more particularly, concerns a new and improved pneumatic tire which, viewed in cross-section, consists of at least two superimposed tire plies or sheets, which may be in the form of simple rubber plies and/or reinforcement plies, and further deals with an improved manufacturing technique or method for the fabrication of the new and improved pneumatic tire of this invention.

During conventional procedures for the fabrication of pneumatic tires a tire blank is formed, for instance at a collapsible drum, by winding in superimposed fashion (build-up of the tire blank) individual plies or layers of rubberized cord, tread strips, and so forth, the thus-formed tire blank then being brought into its final shape in a vulcanization press and is vulcanized. The manufacture of the tire blank is extremely time-consuming and complicated owing to the multiplicity of individual working steps. The individual plies or layers must be oriented as accurately as possible in order to obtain optimum regularity of the tire.

While indeed certain auxiliary measures have been proposed in the art for facilitating the application of the plies or layers between the supply device and the tire building drum, such as guide mechanisms for this purpose, such however automatically afford relatively large tolerances owing to the elasticity of the plies. If such irregularities tend to summate then it is readily possible that unusable tire blanks are fabricated.

Apart from the foregoing drawback of the prior art tire manufacturing techniques it is here to be noted that each joint or junction area at the tire represents a weakened location for the tire because the local reinforcement characterizes a rigidity which, in turn, tends to cause an increased heat build-up. This phenomenon becomes that more critical the larger number of joint areas tend to lie in superimposed fashion above one another. Each joint at the tire represents a geometric irregularity. Owing to these geometric irregularities the tires tend to exert, throughout their periphery, forces in a radial direction and in a direction with respect to the axis of rotation. A large number of joints or junction points at the tire results in increased consumption of material.

Furthermore, the operator is unable to devote his complete attention to one or only a few number of work steps. Quite to the contrary, he is required to carry out a large number of working steps or operations. This, in turn, oftentimes leads to the undesirable result that the same care is not exerted for all of the working operations.

In order to reduce the number of joints or junction areas the prior art has already proposed application of a single ply in a number of coils or windings. However, with this prior art tire manufacturing technique the superimposed coils or layers of the ply exhibit the same direction of the cord. As a result, it is not possible to obtain a cross-compounded or laminated layer arrangement possessing a crossover of the cords at the individual layers which is desirable for carcass laminates. Moreover, the cords of the coils or layers tend to become pressed into one another, resulting in irregularities being formed at the single ply which is wound into such superimposed coils or layers.

SUMMARY OF THE INVENTION

Therefore, there is still present a real need in the art for pneumatic tires and methods of fabricating such pneumatic tires which are not associated with the aforementioned drawbacks of the prior art. Accordingly, it is a primary objective of the present invention to provide an improved pneumatic tire, and also an improved method of manufacturing such pneumatic tire, which effectively overcomes to a large extent the aforementioned drawbacks existing in the prior art and which reliably and economically fulfills the existing need.

Still a further significant object of the present invention relates to an improved pneumatic tire manufacturing technique which is considerably simpler and more economical than the prior art fabrication techniques for pneumatic tires.

Now in order to implement these and still further objects of the invention, which will become more readily apparent as the description proceeds, the pneumatic tire of the present invention is generally manifested by the features that at least one compounded or laminated layer consisting of at least two plies is arranged in a spiral-like configuration at the tire. The plies can be reinforcement plies and/or unreinforced structural plies.

Such construction of tire simplifies and improves its build-up at the tire building machine, as such will be more fully explained hereinafter in conjunction with the consideration of the method aspects of this development. Additionally, it affords a considerable increase in the accuracy and the arrangement or placement of the individual plies of the compounded or laminated layer. Furthermore, the tire manufacturing technique of the invention and the pneumatic tires produced thereby afford the further noteworthy advantage that with a multiple winding in spiral-like configuration of the compounded of laminated layer there is produced a build-up of the individual ply layers in such a way that always the individual ply layers having common direction of the cord are connected or bonded with one another. Consequently, the strength of the compounded or laminated layer of the tire is improved.

In the context of this application it is to be understood that the expression "compounded or laminated layer" is intended to denote a structure formed of at least two tire plies or sheets, and these plies or sheets may be rubber and/or reinforcement plies.

Continuing, in order to fully appreciate the method aspects of this invention it is here noted that the inventive pneumatic tire described above can be fabricated in such a manner that initially the ends of the individual plies or sheets, and preferably also the structural elements for the tire, are placed in offset relationship with respect to one another in the peripheral direction of a tire building drum at the periphery of such tire building drum and are adhered in this offset relationship to the surface thereof. The tire plies and the other structural elements for the tire, if present, are then conjointly built-up at the tire building drum and cross-cut in such a fashion that the plies possess the same length. Thus it is possible to simultaneously build-up a plurality of such plies or sheets, whereby the working time is considerably reduced for the actual tire manufacturing operations. With this inventive technique, it is also possible to always fix in an exact position with respect to one another the end portions of the individual plies or sheets.

A further manufacturing technique as proposed by the invention is manifested by the features that the individual layers and preferably also the structural elements are united into a compounded or laminated layer or web, and if desired, cross-cut or cut to size, whereupon such compunded web is then built-up at the tire building drum. With this manufacturing technique it is possible to prefabricate at efficiently operating doubling machines the composite webs which may consist of reinforcement plies or sheets and/or unreinforced structural plies or sheets. Consequently, the tire building machines are considerably relieved as to their own operation, and therefore can be designed to be much simpler in construction. The delivery devices for the semi-finished product which oftentimes are very complicated in construction can be designed so that they require very little space.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 schematically illustrates a compounded or laminated layer wound upon a tire building drum during the manufacture of the inventive pneumatic tire according to the method aspects of this invention;

FIG. 2 is a fragmentary top plan view of the compounded or laminated layer consisting of at least two plies or sheets and equipped with an inner plate member and structural elements as contemplated to be used for the manufacture of the inventive pneumatic tires;

FIG. 3 is a schematic fragmentary view of a spirally wound compounded or laminated layer arrangement used in the manufacture of the inventive pneumatic tires;

FIG. 4 is an end view of the compounded or laminated layer arrangement of FIG. 3;

FIG. 5 schematically illustrates an end view of a different arrangement of the compounded or laminated layer used for the manufacture of a pneumatic tire as shown in FIG. 6;

FIG. 6 is a fragmentary plan view showing the arrangement of the spirally wound plies of the compounded or laminated layer structure of FIG. 5;

FIG. 7 is a fragmentary top plan view of a modified form of compounded or laminated layer having beveled ends;

FIG. 8a is a side or end view of the laminated or compounded layer arrangement of FIG. 7 showing in particular the beveled end portions of the individual plies or sheets forming such laminated layer;

FIG. 8 is an end view of a laminated layer arrangement somewhat modified from that shown in FIGS. 7 and 8a;

DETAILED DESCRIPTION OF THE PREFERRED EMBODIMENTS

Figure 9:
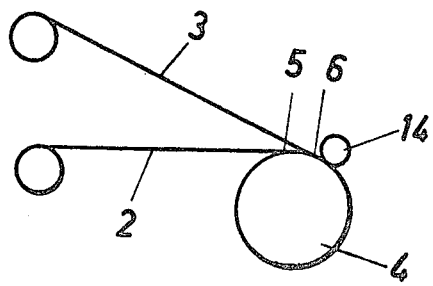
FIG. 9 schematically illustrates the winding operation for the compounded or laminated layer upon a tire building drum.

At this juncture it is again recalled that previously it was indicated that the expression "compounded or laminated layer" as used in the context of this application was intended to denote at least two tire plies or sheets, and it was further indicated that such individual plies or sheets could be simply rubber plies and/or reinforcement plies. Now, by referring to FIG. 1 there has been schematically illustrated such type compounded or laminated layer 1 composed of two tire plies or sheets 2 and 3 which are conjointly spirally wound upon a tire building drum 4 in such a manner that there results a total of four individual ply layers 2a, 3a, 2b and 3b respectively, as referenced in FIG. 1. The innermost situated ends 5, 6 and the outermost situated ends 7, 8 of these plies 2, 3 are offset with respect to one another in the peripheral direction of the tire building drum, as shown in FIG. 1, in order to provide a continuous transition. FIG. 1 therefore serves to illustrate the general manner of spirally winding the compounded or laminated layer 1 upon the tire building drum 4, while details of the various possible arrangements for these compounded or laminated layer constuctions will be considered in conjunction with FIGS. 2 to 8 inclusive.

With the aforegoing in mind, and turning attention now specifically to FIG. 2, there is shown therein one desirable form of compounded or laminated layer 9 formed of an inner plate 10 upon which there are placed two plies or sheets 2 and 3 and two side strips 11. The inner plate 10 can possess a length which only amounts to one revolution of the tire building drum 4, in other words, amounts to the circumference thereof. The inner plate 10, typically formed as a rubber sheet, by way of example, and the two side strips 11, constitute structural elements of the tire, which of course may be different from those shown, as for instance bead covers, intermediate layers, and similar structures found in the tire building art. Additionally, by further referring to FIG. 2 it will be noted that the cords 20 of the plies or sheets 2, 3, in the embodiment under consideration extend diagonally between the lengthwise edges 21 and 22 of these respective tire plies 2 and 3. Equally, it will be recognized that the cords 20 of the ply 2 extend in an opposite direction from the cords 20 of the ply 3, in other words, the cords of the ply 2 extend from the left hand side of FIG. 2 downwardly towards the right hand side thereof, while the cords of the ply 3 extend from the right hand side of FIG. 2 downwardly towards the left hand side thereof. As a result, there is provided a criss-cross arrangement of the cords of the adjacent plies or sheets 2, 3. Furthermore, the individual plies 2 and 3 are cross-cut or cut to length at their respective ends 23, 24 in a direction corresponding to the direction of extension of the associated cords 20 thereof. It is here also mentioned that depending upon the build-up of a pneumatic tire blank it is possible to unite or combine the most different combinations of plies or sheets into a compounded or laminated layer. Furthermore, the possibilities of such combinations can be broadened by winding in superimposed fashion a number of such compounded or laminated layers, possibly also in conjunction with individual or single plies.

Now, in FIGS. 3 and 4 there is shown a compounded or laminated layer 12 which consists of the plies or sheets 2' and 3', the inner ends 5', 6' and the outer ends 7' and 8' thereof have been cut to length or crosscut in a direction parallel to the tire cords, as previously explained above. As particularly well observed by referring to FIG. 3, at the inner end of the spiral-like wound arrangement of this laminated layer 12 the lower ply or sheet 2' is completely covered by the upper ply or sheet 3'. Owing to the cross-cut of the ends 25, 26 of the compounded or laminated layer 12 in the direction of the tire cords there is provided at the region of the tire length L a continuous transition from zero or practically zero up to the maximum cross-section of the compounded or laminated layer 12. In other words, looking at point or location 27 it may be assumed that the cross-section of the compounded layer 12 amounts to zero or practically zero and as one progressively moves down in the showing of FIG. 3 from location 27 along the length of the ply the cross-section progressively and continuously increases until reaching the maximum cross-section of the compounded layer. Since the plies or sheets 2' and 3' are approximately of equal length, this favorable transition also occurs at the outer spiral end which in the wound-up condition of the compounded layer approximately comes to bear over the inner spiral end, as best shown by referring to FIG. 3. After the tire building operation all of the ends of the plies must overlap at the joint area by the amount of the length l, since otherwise there would result a weakening of the compounded layer 12 at this location. The length l is independent of the make-up or construction of the compounded layer 12, must however, in any case, be greater than zero.

FIG. 5 and FIG. 6 schematically depict a modified arrangement of compounded or laminated layer 18, wherein the inner end 5' of the lower tire ply or sheet 2' extends past the inner end 6' of the upper situated or thereabove located tire ply 3'. This modification is especially advantageous for the combination of a reinforcement ply with an unreinforced structural element, as previously considered, since in this case there is only formed a single air inlet location $a$ as opposed to the two air inlet locations 30, 31 formed with the arrangement of laminated sheet 12 of FIGS. 3 and 4. The entry of air between the plies could separate such from one another, resulting in an undesirable premature wear of the compounded or laminated sheet. In other respects, the laminated sheet 18 of the arrangement of FIGS. 5 and 6 corresponds essentially to what was discussed above in conjunction with the laminated sheet 12 of the arrangement of FIGS. 3 and 4.

Now, with the embodiment of compounded or laminated sheet 13 as shown in FIGS. 7, 8a and 8 the plies or sheets 2 and 3 are essentially cross-cut or cut to length in a direction perpendicular to the lengthwise direction, in other words, essentially perpendicular to the lengthwise edges 21 and 22 of the associated plies 2, 3, whereby the ply ends 5, 6 are conjointly cut. In order to also in this case avoid the formation of an extreme or pronounced joint area the end portions 5 and 6 of the plies are preferably not blunt, rather beveled, as best shown at locations 5a, 6a of FIG. 8a, so that such end portions 5 and 6 taper out to zero or practically zero. This beveling 5a, 6a can be, for instance, carried out by performing a conjoint inclined cutting action at the plies 2, 3 with the aid of an appropriately inclined cutting knife or other cutting tool. Furthermore, the ends 5 and 6, just as was the case with the previously considered embodiments 1 to 6, could here also be offset with respect to one another in the lengthwise direction of the plies or the periphery of the tire building drum. In fact, it has been found desirable if the compounded layer 13 is beveled in the direction of travel of the tire at an angle of at least 60°, preferably about 75° to 90°.

FIG. 9 schematically illustrates the winding operation performed at the plies or sheets to form a spirally configured compounded or laminated sheet as previously explained. The ends 5 and 6 of the plies or sheets 2 and 3 are secured at a spacing from one another to the surface of a tire building drum 4 and conjointly wound into spiral-like configuration at such drum, for instance by performing two revolutions of the tire building drum 4. A contact roll 14 presses the plies 2, 3 against one another during this winding operation. Upon completion of the winding operation the plies or sheets 2, 3 are cut to length or cross-cut in such a way that they possess the same length. However, it would be possible to already wind-up onto the drum for the purpose of building the tire, plies which have previously already been cross-cut or cut to length. By virtue of these measures it is possible to simultaneously wind-up two or more layers, whereby the tire build-up time is appreciably reduced.

Figure 10:
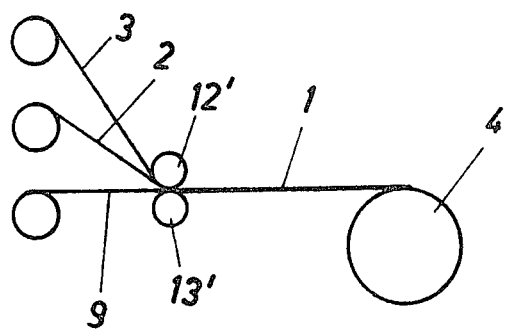
FIG. 10 schematically illustrates a modified version of the winding operation for the compounded or laminated layer wound upon such tire building drum.

FIG. 10 schematically illustrates a modified version of the inventive tire fabricating technique, where in this case the relatively complicated delivery mechanisms for the above described method can be dispensed with. The plies 2 and 3, for instance by means of an inner plate 9, are united through the action of the rollers 12' and 13' into a compounded or laminated layer 1 which is then wound in spiral-like form onto the tire building drum 4. The apparatus for uniting the individual plies or sheets can also be erected separately from the tire building drum and if it possesses a considerably sufficient output or capacity it can serve to supply a number of tire building machines with the laminated sheets. Consequently, this laminated or compounded sheet can be fabricated in a considerably more rational manner. Furthermore, the actual work which needs to be performed at the tire building machine is reduced, and accordingly, the tire building machines themselves can be designed much more simply. Since the major portion of the work is no longer performed itself at the tire building machine, it is possible to equally considerably increase the output thereof.

Furthermore, with a rational build-up of complicated composite or compounded sheets it is possible to also combine both of the above-described methods. Thus, for instance, it would be possible to build-up at the drum in accordance with the first described method two single or individual compounded sheets.

For purposes of further elucidating the invention, there will now briefly be given hereinafter two examples for fabricating tire blanks according to the invention.

Example 1: Manufacture of a passenger car-tire blank.

a. Application of the inner plate (length corresponding to one revolution of the tire building drum);

b. Application of the ends of the first and second reinforcement inserts or plies in offset relationship to one another in the peripheral direction of the tire building drum;

c. Building-up the reinforcement inserts (carcass) by performing two revolutions of the tire building drum;

d. Application of the core filling layers;

e. Turn-up or upsetting of the reinforcement inserts; and f. Application of the tread.

Example 2: Manufacture of a truck or lorry-tire blank.

a. Building-up of the inner plate (length corresponding to one revolution of the tire building drum);

b. Doubling of the first and second reinforcement inserts to form a first compounded or laminated sheet;

c. Building-up the first compounded sheet (two revolutions of the drum);

d. Application of the first core insert;

e. Turning-up the first compounded sheet;

f. Doubling of a third and fourth reinforcement insert to provide a second compounded sheet;

g. Building-up of the second compounded sheet (two revolutions of the drum);

h. Application of the second core insert;

i. Turning-up the second compounded sheet; and j. Building-up the tread.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A pneumatic tire composed of a compounded layer consisting of at least two contiguous plies and arranged in spiral-like configuration at the tire, wherein the end portions of two similar ends of two contiguous plies are in offset and overlapped relationship to the end portions of the other two similar ends of the two contiguous plies in the circumfrential direction of the tire, said end portions having ends which are cut obliquely to the circumferential direction of the tire.

2. The pneumatic tire as defined in claim 1, wherein said compounded layer further includes reinforcement-free structural elements.

3. The pneumatic tire as defined in claim 1, wherein said spirally-wound plies incorporate inner located ply ends arranged in superimposed fashion, with the upper ply completely covering the lower ply at the region of said inner ply ends.

4. The pneumatic tire as defined in claim 1, wherein each of said plies incorporates ply cords extending in a predetermined direction, and wherein each of said plies is cross-cut substantially in the direction of the associated cords of such ply.

5. The pneumatic tire as defined in claim 1, wherein said compounded layer possesses ends which are beveled in thickness and cut at an angle of at least 60°.

6. The pneumatic tire as defined in claim 5, wherein said angle is in the range of 75° to 90°.

7. The pneumatic tire as defined in claim 5, wherein the thickness of said compounded layer at said beveled ends approximates zero.

* * * * *